Patented May 25, 1943

2,320,090

UNITED STATES PATENT OFFICE 2,320,090

DIACYL ACRYLAMIDE AND ITS
PREPARATION

Joy G. Lichty, Stow, Ohio, assignor to Wingfoot Corporation, Akron, Ohio, a corporation of Delaware No Drawing. Application July 22, 1942,
Serial No. 451,944

5 Claims. (Cl. 260—561)

This invention relates to the preparation of diacyl acrylamides and to the product so prepared. This application is in part a continuation of my application Serial No. 314,634, filed January 19, 1940.

According to the process of this invention, the diacyl acrylamides are prepared by reacting with a carboxylic acid anhydride an acrylonitrile of the general formula $CH_2:CX.CN$ where X designates hydrogen, halogen or an alkyl, monovalent alkylene or aryl group.

Among the acrylonitriles which may be used in the reaction are acrylonitrile, methacrylonitrile, ethacrylonitrile, propylacrylonitrile and other alpha alkyl acrylonitriles, phenyl acrylonitrile, vinyl acrylonitrile, chloroacrylonitrile, and bromoacrylonitrile, etc.

The carboxylic acid anhydrides which may be used include acetic anhydride, propionic anhydride, butyric anhydride, iso butyric anhydride, phthalic anhydride, maleic anhydride, succinic anhydride, acrylic anhydride, etc.

The conditions employed in reacting the acrylonitrile body with the alcohol, acid or anhydride, may be any which will effect the combination, equimolecular proportions ordinarily being employed, although these proportions may be varied, the reaction usually being monomolecular regardless of the proportions present. A temperature of 100–250° C. is sufficient in most cases, although temperatures both below and above these limits may sometimes be used, superatmospheric pressure being incidentally generated at the higher temperatures, since a closed vessel, such as an autoclave, must be employed to confine the reaction.

The process may be illustrated by the following example:

A solution of 41 cc. of methacrylonitrile and 47 cc. of acetic anhydride was sealed in a glass tube and heated to 200° C. in an electric furnace for 2½ hours. Upon cooling there was obtained a yellow liquid containing a gel. The gel was dissolved in acetone and precipitated in alcohol to give a solid which melted in part at 195° C. The reaction is illustrated by the following equation:

The above process may readily be applied to the reaction of other acrylonitriles with other anhydrides. The compounds obtained are diacyl acrylamide of the general formula:

in which X designates hydrogen or halogen or an alkyl, monovalent alkylene or aryl radical and R designates an alkyl or aryl radical.

Copolymers of diacyl arcrylamides and their preparation are covered in my companion application Serial No. 451,945, filed July 22, 1942.

What I claim is:

1. The method of preparing a diacyl acrylamide which comprises reacting under heat a carboxylic acid anhydride with an acrylonitrile of the formula $CH_2:CX.CN$ in which X is selected from the group consisting of hydrogen, halogen, an alkyl, vinyl acrylonitrile and phenyl acrylonitrile, to combine the same in equimolecular proportions.

2. The method of preparing diacetyl methacrylamide which comprises reacting under heat methacrylonitrile with acetic anhydride to combine the same in equimolecular proportions.

3. The method of preparing a diacyl acrylamide which comprises reacting at a temperature of about 100 to 250° in approximately equimolecular proportions a carboxylic acid anhydride and an acrylonitrile having the formula $CH_2:CX.CN$ in which X is selected from the group consisting of hydrogen, halogen, alkyl, vinyl acrylonitrile and phenyl acrylonitrile.

4. A diacyl acrylamide.

5. Diacetyl methacrylamide.

JOY G. LICHTY.